United States Patent
Yano (10) Patent No.: US 8,792,649 B2
(45) Date of Patent: Jul. 29, 2014

(54) ECHO CANCELLER USED FOR VOICE COMMUNICATION

(75) Inventor: Atsuyoshi Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 594 days.

(21) Appl. No.: 13/058,212

(22) PCT Filed: Sep. 24, 2008

(86) PCT No.: PCT/JP2008/002638
§ 371 (c)(1),
(2), (4) Date: Feb. 9, 2011

(87) PCT Pub. No.: WO2010/035308
PCT Pub. Date: Apr. 1, 2010

(65) Prior Publication Data
US 2011/0135105 A1    Jun. 9, 2011

(51) Int. Cl.
*H04B 3/20* (2006.01)
*H04M 9/08* (2006.01)

(52) U.S. Cl.
USPC .................. 381/66; 379/406.01; 379/406.05; 379/406.08; 379/406.12

(58) Field of Classification Search
None
See application file for complete search history.

(56) References Cited

U.S. PATENT DOCUMENTS

| | | | |
|---|---|---|---|
| 6,195,430 B1 * | 2/2001 | Eriksson et al. | 379/406.05 |
| 2006/0018459 A1 | 1/2006 | McCree | |

FOREIGN PATENT DOCUMENTS

| | | |
|---|---|---|
| EP | 0667700 A2 | 8/1995 |
| JP | 10-190533 A | 7/1998 |
| JP | 11-331046 A | 11/1999 |
| JP | 2001-44896 A | 2/2001 |
| JP | 2002-84212 A | 3/2002 |
| JP | 2006-33789 A | 2/2006 |
| JP | 2006-313954 A | 11/2006 |
| JP | 2007-259202 A | 10/2007 |

OTHER PUBLICATIONS

"Echo Cancellers", ITU-T Recommendation G.165, Mar. 1993, pp. 17-20.

* cited by examiner

*Primary Examiner* — Joseph Saunders, Jr.
*Assistant Examiner* — James Mooney
(74) *Attorney, Agent, or Firm* — Birch, Stewart, Kolasch & Birch, LLP.

(57) ABSTRACT

An adaptive filter unit outputs a send-mid signal obtained by eliminating echo from a send-in signal, and a power comparing unit calculates a power ratio between received signal power and send-mid signal power. When a receiver ST detecting unit detects a single talk state at a receiving side, an acoustic coupling amount estimating unit estimates and updates the estimated amount of acoustic coupling from the power ratio. A residual echo power estimating unit estimates estimated residual echo power from the received signal power and the estimated amount of acoustic coupling, and a signal-to-echo ratio estimating unit estimates a ratio between the send-mid signal power and the estimated residual echo power. An amplitude suppression coefficient determining unit determines the amplitude suppression coefficient corresponding to the ratio, and an amplitude suppression unit amplitude suppresses the send-mid signal.

3 Claims, 5 Drawing Sheets

ECHO CANCELLER USED FOR VOICE COMMUNICATION

TECHNICAL FIELD

The present invention relates to an acoustic echo canceller used for voice communication.

BACKGROUND ART

An acoustic echo canceller employing linear echo processing estimates a transfer function of an echo path from a speaker to a microphone by means of an adaptive filter or the like, and generates a pseudo-echo signal. Then, it eliminates echo contained in transmission voice by subtracting the pseudo-echo signal from a transmission voice signal input to the microphone. The acoustic echo canceller has an advantage of being able to eliminate only the echo without impairing the transmission voice even in a state in which the echo and transmission voice overlap each other, that is, in a double talk state. However, because of an estimation error that can occur in the transfer function of the echo path and a residual echo that can occur owing to nonlinear echo and the like, the resultant echo canceling effect has its own limit.

On the other hand, an acoustic echo canceller using nonlinear echo processing suppresses echo directly by applying amplitude suppression processing to a voice signal using a voice switch, center clipper and variable attenuator. The acoustic echo canceller has an advantage of being able to eliminate echo surely without producing residual echo with a simple configuration. However, it has a problem of impairing quality of sound because it suppresses transmission voice together with the echo in a double talk state.

To solve the foregoing problems, a standard acoustic echo canceller eliminates a main component of the echo by linear echo processing, and eliminates residual echo after the elimination by the nonlinear echo processing only when the transmission voice is inactive. Such a configuration is described in a Non-Patent Document 1.

However, in an environment in which a transmission-voice-to-echo ratio is comparatively bad in the signal power, since the transmission voice is tend to be hidden easily by the echo, it becomes harder to make a decision as to whether the transmission voice is active or not. As a result, the acoustic echo apparatus cannot detect the transmission voice in the double talk state. Accordingly, it has a problem of impairing the transmission voice by carrying out excessive nonlinear echo processing.

To solve the foregoing problem, Patent Document 1, for example, discloses a method of flexibly controlling a suppression coefficient used for the amplitude suppression of the voice signal in the nonlinear echo processing.

An echo suppressor disclosed in Patent Document 1 computes the power of only the transmission voice by subtracting the power of the echo signal from the power of the transmission signal including the transmission voice and echo superposed thereon, adds a prescribed masking threshold to the transmission voice power, and employs the value normalized by the power value of the transmission signal as the suppression coefficient. By carrying out the nonlinear echo processing by using the suppression coefficient, the echo suppressor automatically weakens the suppression in the double talk state in which the transmission voice is active, thereby making it harder to impair the transmission voice. Incidentally, the power of the echo signal is estimated from the product of the power of the received signal and the amount of acoustic coupling of the echo path.

Non-Patent Document 1: ITU-T Recommendation G.165 (pp. 17-20).

Patent Document 1: Japanese Patent Laid-Open No. 2002-84212 (Paragraphs 0039-0042).

For example, although a conventional echo canceller such as that described in Patent Document 1 estimates the power of the echo signal from the product of the power of the received signal and the amount of acoustic coupling of the echo path, it is difficult to measure the amount of acoustic coupling because it is subjected to the influence of fluctuations of the echo path and surrounding noise. Accordingly, the estimated power of the echo signal always has an estimation error, and hence the transmission voice power computed from the power of the echo signal has an error.

In particular, in an environment in which the transmission-voice-to-echo ratio is very bad such as a hands-free phone, the influence of the error is conspicuous. Thus, it sometimes occurs that the estimation value of the transmission voice power becomes below zero when computing the power of the transmission signal by subtracting the estimation value of the power of the echo signal from the power of the transmission signal. As a result, a problem arises of impairing the transmission voice because of excessive echo suppression occurring in the nonlinear echo processing.

With the foregoing configuration, the conventional echo canceller has a problem of impairing the transmission voice in the double talk state in the environment in which the transmission-voice-to-echo ratio is bad.

Incidentally, to avoid the problem of impairing the transmission voice in the conventional method described by way of example of Patent Document 1, the masking threshold described before must be set at a very high value to reduce the echo suppression. In this case, however, a problem arises in that the echo cannot be suppressed sufficiently as a harmful influence.

The present invention is implemented to solve the foregoing problems. Therefore it is an object of the present invention to provide an echo canceller capable of achieving sufficient echo processing performance without impairing the transmission voice even in a double talk state in an environment in which the transmission-voice-to-echo ratio is bad.

DISCLOSURE OF THE INVENTION

An echo canceller in accordance with the present invention includes: an adaptive filter unit for outputting a send-mid signal by eliminating echo from a send-in signal in which transmission voice and echo are mixed; a receiver single talk detecting unit for detecting a single talk state on a receiving side using a received signal and the send-mid signal; a first power calculating unit for calculating power of the received signal; a second power calculating unit for calculating power of the send-mid signal; an acoustic coupling amount estimating unit for estimating and updating an amount of acoustic coupling from a power ratio of the send-mid signal and the received signal when the receiver single talk detecting unit detects the single talk state; a residual echo power estimating unit for estimating residual echo power of the send-mid signal from the power of the received signal and the amount of acoustic coupling; a signal-to-echo ratio estimating unit for estimating a signal-to-echo ratio from a ratio between the power of the send-mid signal and the residual echo power; an amplitude suppression coefficient determining unit for determining an amplitude suppression coefficient in accordance with the signal-to-echo ratio; and an amplitude suppression unit for amplitude suppressing the send-mid signal according to the amplitude suppression coefficient.

This makes it possible to achieve an echo canceller that realizes sufficient echo processing performance without impairing transmission voice even if the residual echo power cannot be estimated accurately in an environment with bad transmission-voice-to-echo ratio.

An echo canceller in accordance with the present invention includes: an adaptive filter unit for outputting a send-mid signal by eliminating echo from a send-in signal in which transmission voice and echo are mixed; a receiver single talk detecting unit for detecting a single talk state on a receiving side using a received signal and the send-mid signal; a first frequency converting unit for converting the received signal to a frequency spectrum; a first power spectrum calculating unit for calculating a power spectrum from the frequency spectrum of the received signal; a second frequency converting unit for converting the send-mid signal to a frequency spectrum; a second power spectrum calculating unit for calculating a power spectrum from the frequency spectrum of the send-mid signal; an acoustic coupling amount estimating unit for estimating and updating an amount of acoustic coupling from a power spectrum ratio between the send-mid signal and the received signal when the receiver single talk detecting unit detects the single talk state; a residual echo power spectrum estimating unit for estimating a residual echo power spectrum of the send-mid signal from the power spectrum of the received signal and the amount of acoustic coupling; a signal-to-echo spectrum ratio estimating unit for estimating a signal-to-echo spectrum ratio from a ratio between the power spectrum of the send-mid signal and the residual echo power spectrum; an amplitude suppression coefficient spectrum determining unit for determining an amplitude suppression coefficient spectrum in accordance with the signal-to-echo spectrum ratio; an amplitude suppression unit for amplitude suppressing a frequency spectrum of the send-mid signal according to the amplitude suppression coefficient spectrum; and an inverse frequency converting unit for converting the frequency spectrum of the send-mid signal passing through the amplitude suppression to a time-series signal.

This makes it possible to carry out amplitude suppression in the frequency domain by calculating amplitude suppression coefficients differing from band to band in the frequency domain, and to further reduce the loss of the talker voice as compared with the case of performing amplitude suppression in the time domain.

BEST MODE FOR CARRYING OUT THE INVENTION

The best mode for carrying out the invention will now be described with reference to the accompanying drawings to explain the present invention in more detail.

Embodiment 1

Figure 1:
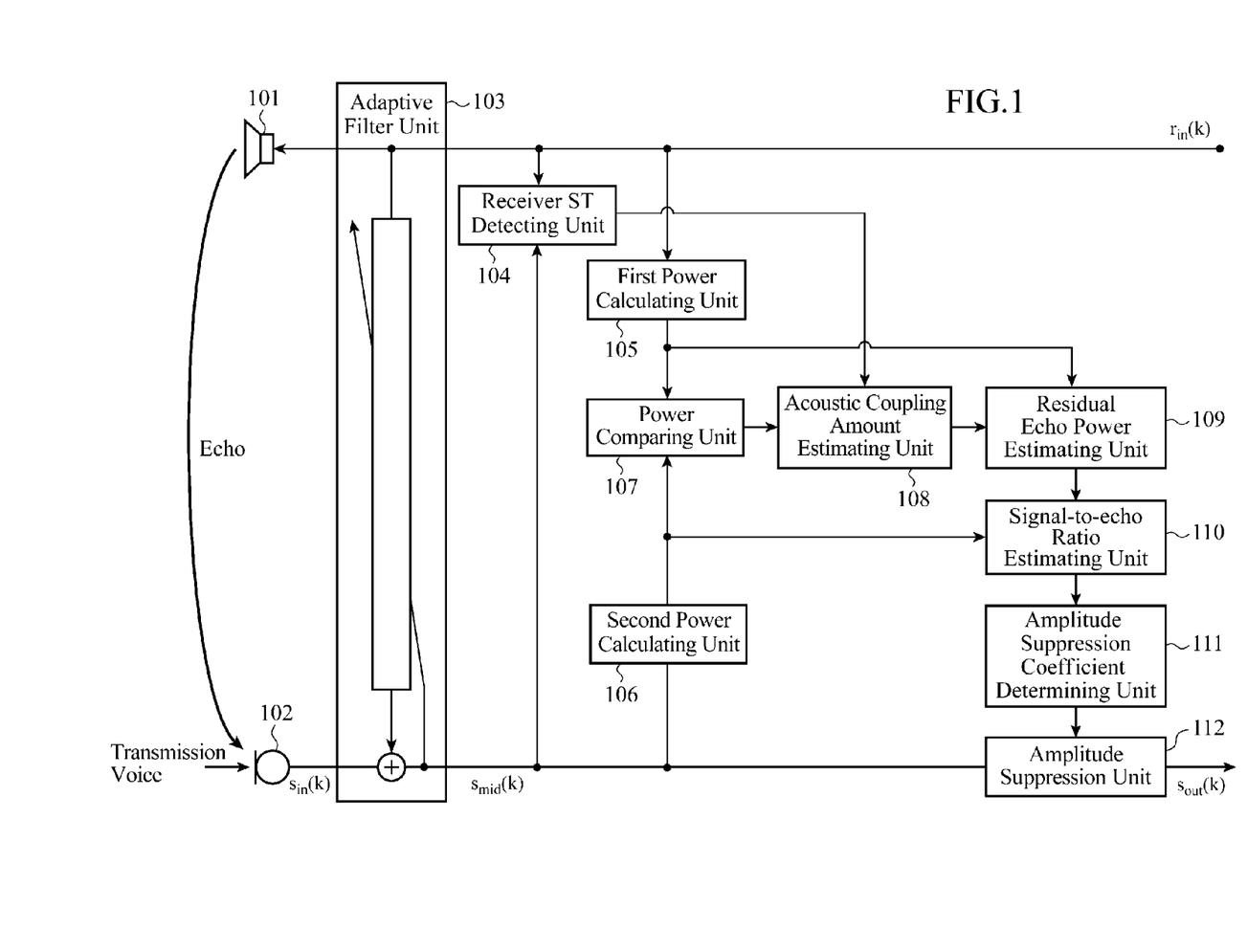
FIG. 1 is a block diagram showing a configuration of the echo canceller of an embodiment 1 in accordance with the present invention.

FIG. 1 is a block diagram showing a configuration of the echo canceller of an embodiment 1 in accordance with the present invention. The echo canceller comprises a speaker 101, a microphone 102, an adaptive filter unit 103, a receiver single talk detecting unit (referred to as "receiver ST detecting unit from now on) 104, first and second power calculating units 105 and 106, a power comparing unit 107, an acoustic coupling amount estimating unit 108, a residual echo power estimating unit 109, a signal-to-echo ratio estimating unit 110, an amplitude suppression coefficient determining unit 111, and an amplitude suppress ion unit 112. In FIG. 1, $r_{in}(k)$ denotes a received signal, $s_{in}(k)$ denotes a send-in signal, and k denotes time.

Next, the operation of the echo canceller will be described.

The speaker 101 outputs the received signal $r_{in}(k)$ as the received voice. The microphone 102 picks up the received voice the speaker 101 outputs and generates the send-in signal $s_{in}(k)$ combining the transmission voice a talker utters with the echo. Subsequently, the adaptive filter unit 103 receives the send-in signal $s_{in}(k)$ from the microphone 102, and generates a send-mid signal $s_{mid}(k)$ by eliminating echo from the send-in signal $s_{in}(k)$ by linear echo processing.

Incidentally, the adaptive filter unit 103 cannot remove the echo completely, and the send-mid signal $s_{mid}(k)$ includes residual echo. The adaptive filter unit 103 can employ a NLMS (Normalized Least Mean Square) algorithm generally known.

Subsequently, from the received signal $r_{in}(k)$ and the send-mid signal $s_{mid}(k)$ containing the residual echo supplied from the adaptive filter unit 103, the receiver ST detecting unit 104 detects the single talk state of the receiving side in the communication state, that is, the state in which the send-in signal is almost occupied by echo. Then, as a result of detecting the single talk state, the receiver ST detecting unit 104 supplies a detection flag RST(k) to the acoustic coupling amount estimating unit 108.

The detection flag RST(k) indicates a state other than the receiver single talk by 0, and the receiver single talk state by 1. Note, however, that the receiver ST detecting unit 104 makes a decision of the receiver single talk state only when it can decide clearly on the receiver single talk state.

Generally, in an environment where the transmission-voice-to-echo ratio of the send-in signal picked-up with the microphone 102 is bad, it is difficult to make accurate discrimination between the receiver single talk and the double talk. Accordingly, in a condition in which the transmission-voice-to-echo ratio is bad and hence the state as to whether it is the receiver single talk or double talk is uncertain, the configuration is made in such a manner that the receiver single talk state is not detected. In such conditions, the receiver ST detecting unit 104 is configured in such a manner as to detect the receiver single talk only in a condition in which the received signal $r_{in}(k)$ is active and the signal power of the send-mid signal $s_{mid}(k)$ is lower than the prescribed threshold, and hence it can decide that there is no talker voice without fail. Incidentally, in the case of this configuration, it is assumed that the second power calculating unit 106 supplies the receiver ST detecting unit 104 with the power of the send-mid signal.

The first power calculating unit 105 calculates the received signal power for the received signal $r_{in}(k)$ and the second power calculating unit 106 calculates the send-mid signal power for the send-mid signal $s_{mid}(k)$. Then, the power comparing unit 107 receives the received signal power and the send-mid signal power from the first and second power calculating units 105 and 106, and calculates the power ratio sr(k) which is the ratio between the two according to the following Expression (1).

$$sr(k) = \frac{|s_{mid}(k)|^2}{|r_{in}(k)|^2} \quad (1)$$

sr(k): power ratio
$|s_{mid}(k)|^2$: send-mid signal power
$|r_{in}(k)|^2$: received signal power Receiving the detection flag RST(k) from the receiver ST detecting unit 104, the acoustic coupling amount estimating unit 108 updates the estimated amount of acoustic coupling h(k) according to the following Expression (2) when RST(k) is 1, that is, in the receiver single talk state.

$$h(k)=\alpha \cdot sr(k)+(1-\alpha)h(k-1) \quad (2)$$

where $(0<\alpha \leq 1)$.

Receiving the received signal power from the first power calculating unit 105 and the estimated amount of acoustic coupling from the acoustic coupling amount estimating unit 108, respectively, the residual echo power estimating unit 109 calculates the estimated residual echo power by estimating the power of the residual echo contained in the send-mid signal in accordance with the following Expression (3).

Incidentally, when considering the reverberation component of the echo, according to the following Expression (4) instead of the following Expression (3), the residual echo power estimating unit 109 can calculate the estimated residual echo power by adding the estimation value of the previous residual echo power multiplied by a prescribed coefficient to the estimation value of the current residual echo power calculated from the estimated amount of acoustic coupling and the received signal power.

$$|(e(k)|^2=h(k)\times|r_{in}(k)|^2 \quad (3)$$

$$|e(k)|^2=h(k)\times|r_{in}(k)|^2+\beta|e(k-1)|^2$$

where $(0<\beta<1)$ \quad (4)

$|e(k)|^2$: estimated residual echo power
$|r_{in}(k)|^2$: received signal power Next, receiving the send-mid signal power from the second power calculating unit 106 and the estimated residual echo power from the residual echo power estimating unit 109, respectively, the signal-to-echo ratio estimating unit 110 calculates the signal-to-echo ratio ser(k) according to the following defining Expression (5), where a is an arbitrary constant of a >0. The constant a is inserted in order to prevent the denominator of ser(k) from becoming zero when the estimated residual echo power constituting the denominator is zero because there is no echo. It is assumed that a is set in advance in such a manner as to take a sufficiently small value for the estimated residual echo power when the send-in signal contains the talker voice or echo and is active.

$$ser(k) = \frac{|s_{mid}(k)|^2}{|e(k)|^2 + a} \quad (5)$$

Subsequently, the amplitude suppression coefficient determining unit 111 receives the signal-to-echo ratio ser(k) from the signal-to-echo ratio estimating unit 110, and determines the amplitude suppression coefficient g(k) according to the following Expression (6). Here, b and c are constant parameters whose values are set in advance, and are supposed to satisfy b>1 and c>0, respectively. In addition, for the amplitude suppression coefficient g(k), any given lower limit value can be set.

$$g(k) = \begin{cases} \frac{1}{b}\sqrt{ser(k)^c} & ser(k) \leq b^{\frac{2}{c}} \\ 1.0 & ser(k) > b^{\frac{2}{c}} \end{cases} \quad (6)$$

Here, relationships between the amplitude suppression coefficient g(k) and the signal-to-echo ratio ser(k) will be described using amplitude suppression gain G(k) and a logarithmic signal-to-echo ratio SER(k) which are logarithmic expressions of them, respectively. The conversion from the amplitude suppression coefficient g(k) to the amplitude suppression gain G(k) and the conversion from the signal-to-echo ratio ser(k) to the logarithmic signal-to-echo ratio SER(k) are defined by the following Expression (7), respectively.

$$G(k)=20 \log_{10}(g(k))$$

$$SER(k)=10 \log (ser(k)) \quad (7)$$

The relationships between the amplitude suppression gain G(k) and the logarithmic signal-to-echo ratio SER(k) can be given by the following Expression (8) according to the foregoing Expression (6) and Expression (7).

$$G(k) = \begin{cases} c \cdot SER(k) - 20 \log_{10}b & SER(k) \leq \frac{1}{c} \cdot 20 \log_{10}b \\ 0 & SER(k) > \frac{1}{c} \cdot 20 \log_{10}b \end{cases} \quad (8)$$

From the foregoing Expression (8), it is found that a constant b is a parameter that controls the amplitude suppression gain G at SER(k)=0 dB. In addition, it is found that a constant c is a parameter that controls the gradient of the amplitude suppression gain against the logarithmic signal-to-echo ratio. The parameters b and c can be adjusted arbitrarily in accordance with conditions of an application target.

Figure 2:
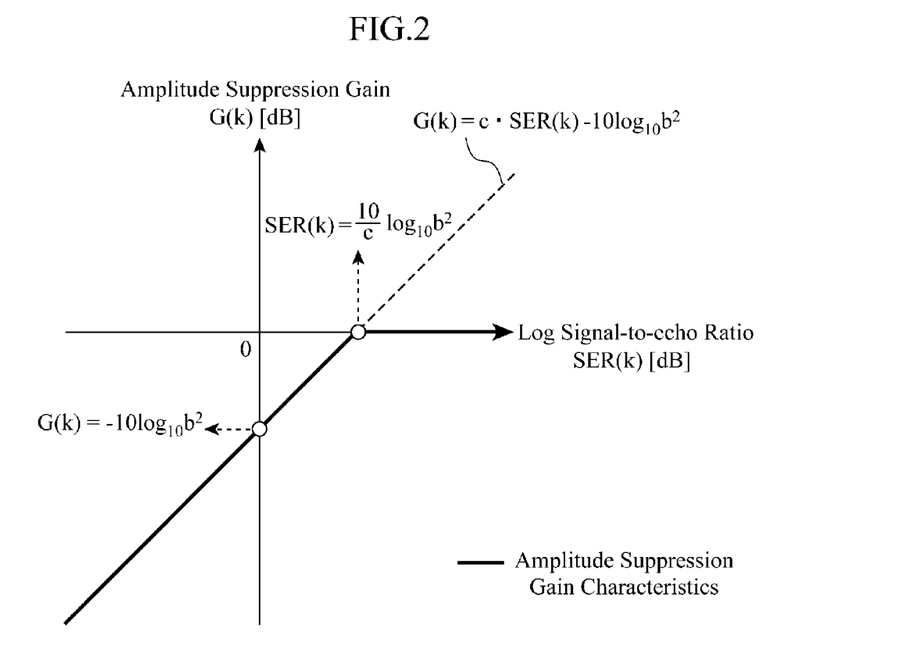
FIG. 2 is a graph showing characteristics of the amplitude suppression gain in the echo canceller of the embodiment 1 in accordance with the present invention.

FIG. 2 is a graph showing linear relationships between the amplitude suppression gain G(k) and the logarithmic signal-to-echo ratio SER(k) defined by the foregoing Expression (8). It shows amplitude suppression gain characteristics against the logarithmic signal-to-echo ratio axis. As shown in FIG. 2, the linear relationships between the amplitude suppression gain G(k) and the logarithmic signal-to-echo ratio SER(k) continue even to a region of SER(k)<0 dB. Essentially, it is unlikely that the residual echo power exceeds the send-mid signal power, and it is always expected that SER(k)>0 dB. However, because of the estimation error of the amount of acoustic coupling, the estimated residual echo power can exceed the send-mid signal power, and the calculation can sometimes result in SER(k)<0 dB.

To cope with this, the echo canceller of the present embodiment defines the amplitude suppression gain characteristics in such a manner that the amplitude suppression gain G(k) and the logarithmic signal-to-echo ratio SER(k) have the linear relationships even in a range of SER(k)<0 dB (Expression (8)). Then, the amplitude suppression coefficient determining unit 111 determines the amplitude suppression coefficient g(k) according to the foregoing Expression (6) that transforms Expression (8) to a relational expression between the amplitude suppression coefficient g(k) and the signal-to-echo ratio ser(k).

The amplitude suppression unit 112 carries out nonlinear echo processing by multiplying the send-mid signal $s_{mid}(k)$ by the amplitude suppression coefficient g(k) as the following Expression (9), thereby generating a send-out signal $s_{out}(k)$ by suppressing the residual echo contained in the send-mid signal $s_{mid}(k)$.

$$s_{out}(k) = g(k) \cdot s_{mid}(k) \quad (9)$$

In this way, even in the range of logarithmic signal-to-echo ratio SER(k)<0 dB, the echo canceller of the present embodiment defines the amplitude suppression gain characteristics in such a manner that the amplitude suppression gain G(k) has the linear relationships with SER(k), has the amplitude suppression coefficient determining unit 111 define the amplitude suppression coefficient g(k) in accordance with the definition, and has the amplitude suppression unit 112 suppress the residual echo. Accordingly, it can prevent the suppression from being applied excessively to the send-mid signal even if the condition of SER(k)<0 dB occurs owing to the estimation error, thereby being able to reduce the loss of the transmission voice.

As described above, according to the embodiment 1, the echo canceller is configured in such a manner as to comprise the adaptive filter unit 103 for eliminating the echo from the send-in signal including the transmission voice and echo mixed with each other and for outputting the send-mid signal; the receiver ST detecting unit 104 for detecting the single talk state of the receiving side using the received signal and send-mid signal; the first power calculating unit 105 for calculating the received signal power; the second power calculating unit 106 for calculating the send-mid signal power; the power comparing unit 107 for calculating the ratio between the send-mid signal power and the received signal power; the acoustic coupling amount estimating unit 108 for estimating and updating the estimated amount of acoustic coupling from the power ratio between the send-mid signal power and the received signal power when the receiver ST detecting unit 104 detects the single talk state; the residual echo power estimating unit 109 for estimating the estimated residual echo power of the send-mid signal from the received signal power and the estimated amount of acoustic coupling; the signal-to-echo ratio estimating unit 110 for estimating the signal-to-echo ratio from the ratio between the send-mid signal power and the estimated residual echo power; the amplitude suppression coefficient determining unit 111 for determining the amplitude suppression coefficient in accordance with the signal-to-echo ratio; and the amplitude suppression unit 112 for amplitude suppressing the send-mid signal according to the amplitude suppression coefficient. Accordingly, even if it cannot estimate the residual echo power accurately in an environment in which the transmission-voice-to-echo ratio is very bad, it can achieve the echo processing with a low transmission voice loss.

In addition, the amplitude suppression coefficient determining unit 111 is configured in such a manner as to determine the amplitude suppression coefficient corresponding to the signal-to-echo ratio according to the foregoing Expression (6). As a result, it can prevent the amplitude suppression from being applied excessively to the send-mid signal even if the estimated residual echo power exceeds the send-mid signal power owing to the estimation error, thereby being able to reduce the loss of the transmission voice.

Furthermore, the residual echo power estimating unit 109 is configured in such a manner as to obtain the residual echo power of the send-mid signal by adding the previously estimated residual echo power to the residual echo power estimated from the power of the current received signal and the amount of acoustic coupling in accordance with the foregoing Expression (4). Accordingly, it can estimate the estimated residual echo power considering the reverberation component of the echo.

Embodiment 2

In the echo canceller of the foregoing the embodiment 1, the amplitude suppression coefficient determining unit 111 determines the amplitude suppression gain G(k) in such a manner that the logarithmic signal-to-echo ratio SER(k) and the amplitude suppression gain G(k) have linear relationships in the range SER(k)<0 dB. In the echo canceller of the present embodiment, the relational expression is defined using a mathematical function according to which the amplitude suppression gain G(k) draws a saturation curve toward infinity of the logarithmic signal-to-echo ratio SER(k) axis.

First, a relational expression between the logarithmic signal-to-echo ratio SER(k) and the amplitude suppression gain G(k) is defined as the following Expression (10). It is assumed here that b, c and d are constant parameters whose values are set in advance, and b and c satisfy b>1 and c>0.

$$G(k) = -20 \log_{10} b \cdot \left(1 - \frac{1}{1 + c^{-(SER(k)-d)}}\right) \quad (10)$$

Figure 3:
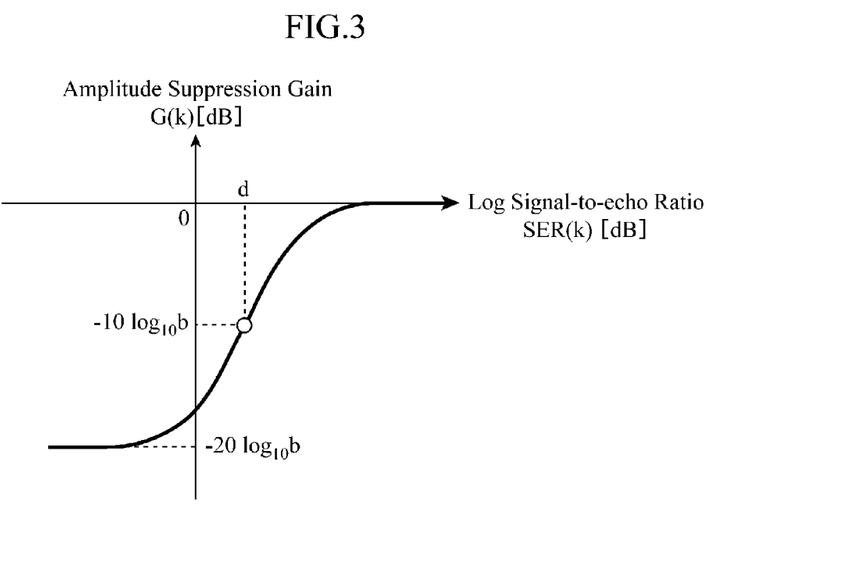
FIG. 3 is a graph showing a characteristic curve of the amplitude suppression gain in the echo canceller of an embodiment 2 in accordance with the present invention.

FIG. 3 is a graph showing a characteristic curve of the amplitude suppression gain G(k) defined by the foregoing Expression (10). As shown in FIG. 3, the amplitude suppression gain G(k) draws a saturation curve toward the infinity of the logarithmic signal-to-echo ratio SER(k) axis. Forming such a saturation curve can reduce fluctuations in the amplitude suppression gain G(k) in a state in which the logarithmic signal-to-echo ratio SER(k) is low, that is, the send-in signal consists of only echo or in a state in which the logarithmic signal-to-echo ratio SER(k) is high, that is, the send-in signal consists of only talker voice. Accordingly, even if the logarithmic signal-to-echo ratio SER(k) has some error, the echo canceller is hardly affected by the error, thereby offering the advantage of being able to stabilize its operation.

In addition, as is manifest in FIG. 3, it is found from Expression (10) that the constant b is a parameter that controls the minimum of the amplitude suppression gain G(k). The constant c is a parameter that controls the gradient of the amplitude suppression gain G(k) for the logarithmic signal-to-echo ratio SER(k). The constant d is a parameter that controls the center position of the transition region of the amplitude suppression gain G(k) by a translation of the characteristic curve along the SER(k) axis in FIG. 3.

Next, a method of calculating the amplitude suppression coefficient in the echo canceller of the present embodiment will be described with reference to FIG. 1. The amplitude suppression coefficient determining unit 111 determines the amplitude suppression coefficient g(k) according to the following Expression (11) which transforms the foregoing Expression (10) to a relational expression between the amplitude suppression coefficient g(k) and the signal-to-echo ratio ser(k). Since the components of the echo canceller other than the amplitude suppression coefficient determining unit 111 are the same as those of the foregoing the embodiment 1, their description will be omitted here.

$$g(k) = \left(\frac{1}{b}\right)^{\left(1-\frac{1}{1+e^{-(10\log_{10}(ser(k))-d)}}\right)} \quad (11)$$

As described above, according to the embodiment 2, it is configured in such a manner that the amplitude suppression coefficient determining unit 111 determines the amplitude suppression coefficient corresponding to the signal-to-echo ratio according to the foregoing Expression (11). Thus, the amplitude suppression gain characteristics have a shape of a saturation curve. Accordingly, the amplitude suppression gain is hardly affected by the error of the logarithmic signal-to-echo ratio, and this makes it possible to stabilize the operation of the echo canceller.

Embodiment 3

The echo cancellers of the foregoing the embodiments 1 and 2 have a configuration in which the amplitude suppression coefficient determining unit 111 determines the amplitude suppression coefficient using the expressions. In contrast, the present embodiment has a configuration of determining the amplitude suppression coefficient from characteristic data that define the amplitude suppression gain G(k) by using a line or approximation curve passing through a plurality of changing points which are set on a characteristic space.

Figure 4:
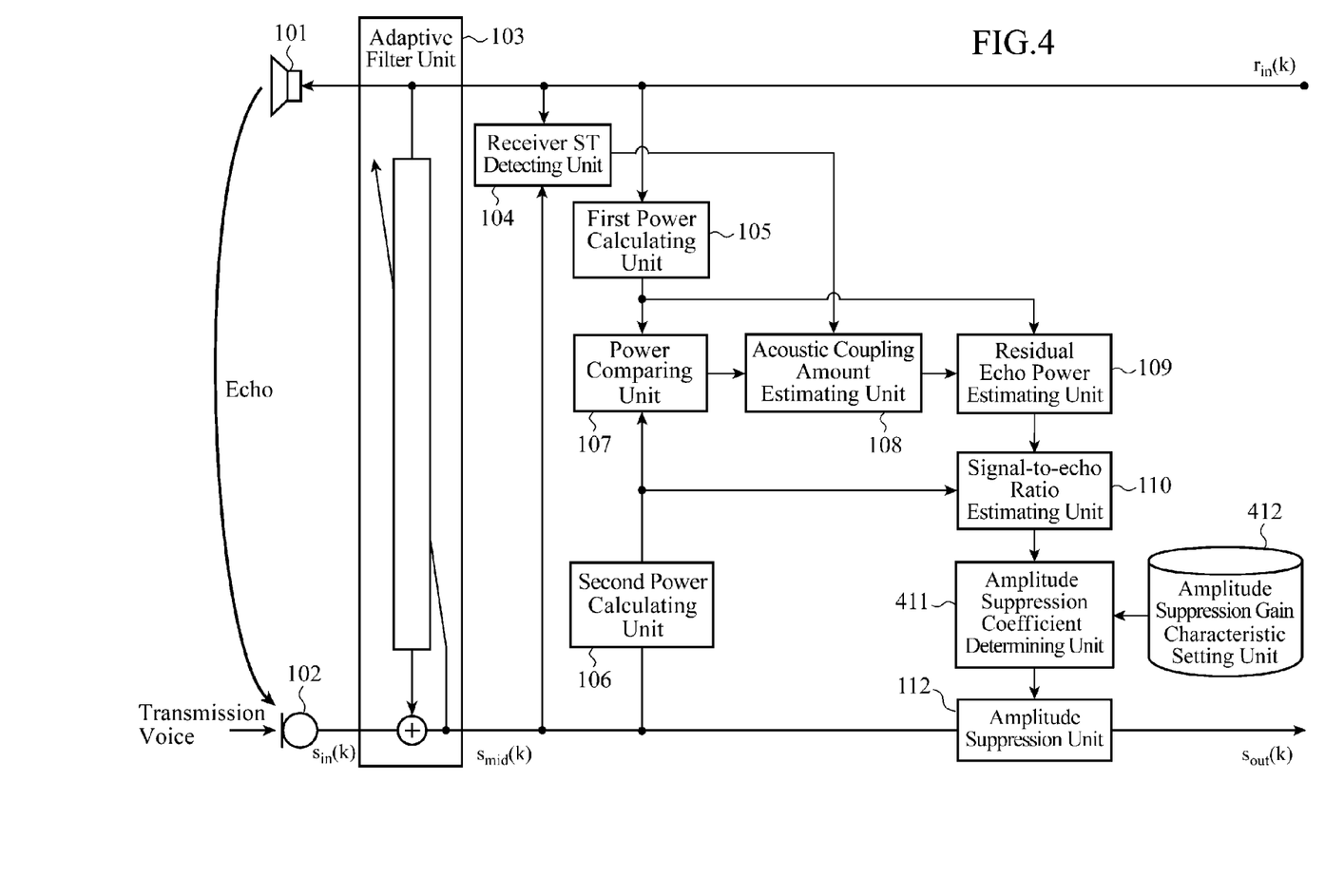
FIG. 4 is a block diagram showing a configuration of the echo canceller of an embodiment 3 in accordance with the present invention.

FIG. 4 is a block diagram showing a configuration of the echo canceller of the embodiment 3 in accordance with the present invention. The echo canceller comprises the speaker 101, microphone 102, adaptive filter unit 103, receiver ST detecting unit 104, first power calculating unit 105, second power calculating unit 106, power comparing unit 107, acoustic coupling amount estimating unit 108, residual echo power estimating unit 109, signal-to-echo ratio estimating unit 110, an amplitude suppression coefficient determining unit 411, an amplitude suppression gain characteristic setting unit 412, and the amplitude suppression unit 112. In FIG. 4, as for the same or like components to those of FIG. 1, they are designated by the same reference numerals and their description will be omitted.

The amplitude suppression gain characteristic setting unit 412 stores characteristic data of the amplitude suppression gain G(k) corresponding to the logarithmic signal-to-echo ratio SER(k).

Figure 5:
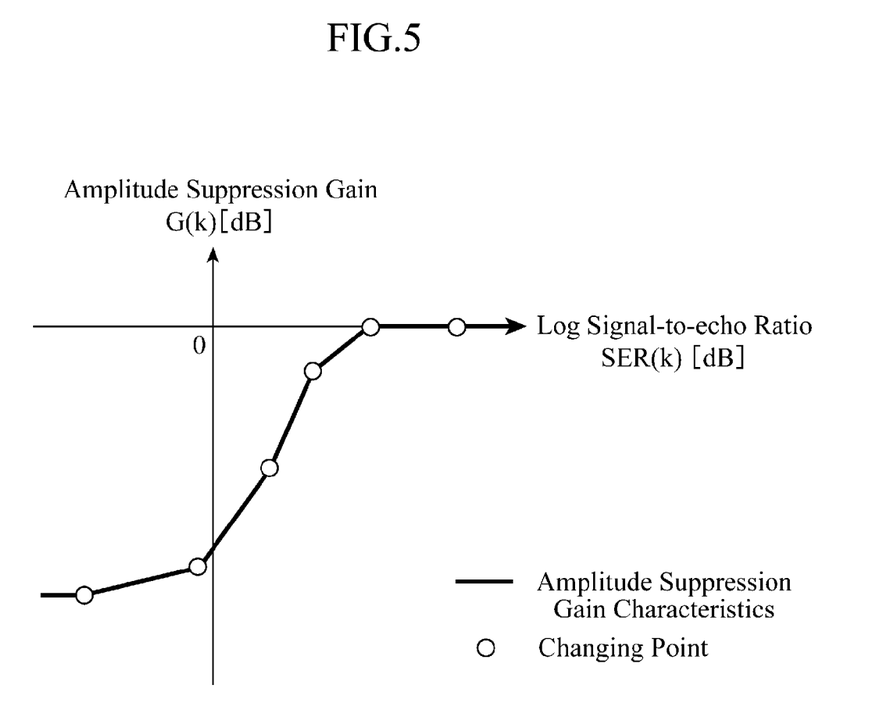
FIG. 5 is a graph showing an example of characteristic data stored in an amplitude suppression gain characteristic setting unit of the echo canceller of the embodiment 3 in accordance with the present invention.

FIG. 5 shows an example of the characteristic data of the amplitude suppression gain G(k) the amplitude suppression gain characteristic setting unit 412 stores, and defines the relationships between the signal-to-echo ratio ser(k) and the amplitude suppression coefficient g(k) in a logarithmic expression. As to a plurality of changing points set on the characteristic space as shown in FIG. 5, the amplitude suppression gain characteristic setting unit 412 stores the characteristic data representing a characteristic curve defined by lines connecting the individual points, by a curve defined by a quadratic or higher degree function, or by an approximation curve connecting all the points. The echo canceller of the present embodiment enables a designer to set the changing points freely to the amplitude suppression gain characteristic setting unit 412. Thus, it generates the characteristic curve and stores it in the amplitude suppression gain G(k) as the characteristic data, thereby being able to adjust the amplitude suppression gain characteristics freely.

The amplitude suppression coefficient determining unit 411 calculates the logarithmic signal-to-echo ratio SER(k) from the signal-to-echo ratio ser(k) supplied from the signal-to-echo ratio estimating unit 110. Then, the amplitude suppression coefficient determining unit 411 reads the amplitude suppression gain G(k) corresponding to the logarithmic signal-to-echo ratio SER(k) from the amplitude suppression gain characteristic setting unit 412, converts it to the amplitude suppression coefficient g(k), and supplies to the amplitude suppression unit 112.

As described above, according to the embodiment 3, the echo canceller is configured in such a manner that it comprises the amplitude suppression gain characteristic setting unit 412 for storing the amplitude suppression gain characteristics defining the relationships between the signal-to-echo ratio and the amplitude suppression coefficient in terms of the amplitude suppression gain characteristic data defined by the lines or approximation curve connecting the plurality of changing points set on the characteristic space freely, and that the amplitude suppression coefficient determining unit 411 determines the amplitude suppression coefficient corresponding to the signal-to-echo ratio from the amplitude suppression gain characteristic data stored in the amplitude suppression gain characteristic setting unit 412. Accordingly, it enables the amplitude suppression gain characteristics to be adjusted freely.

Embodiment 4

Figure 6:
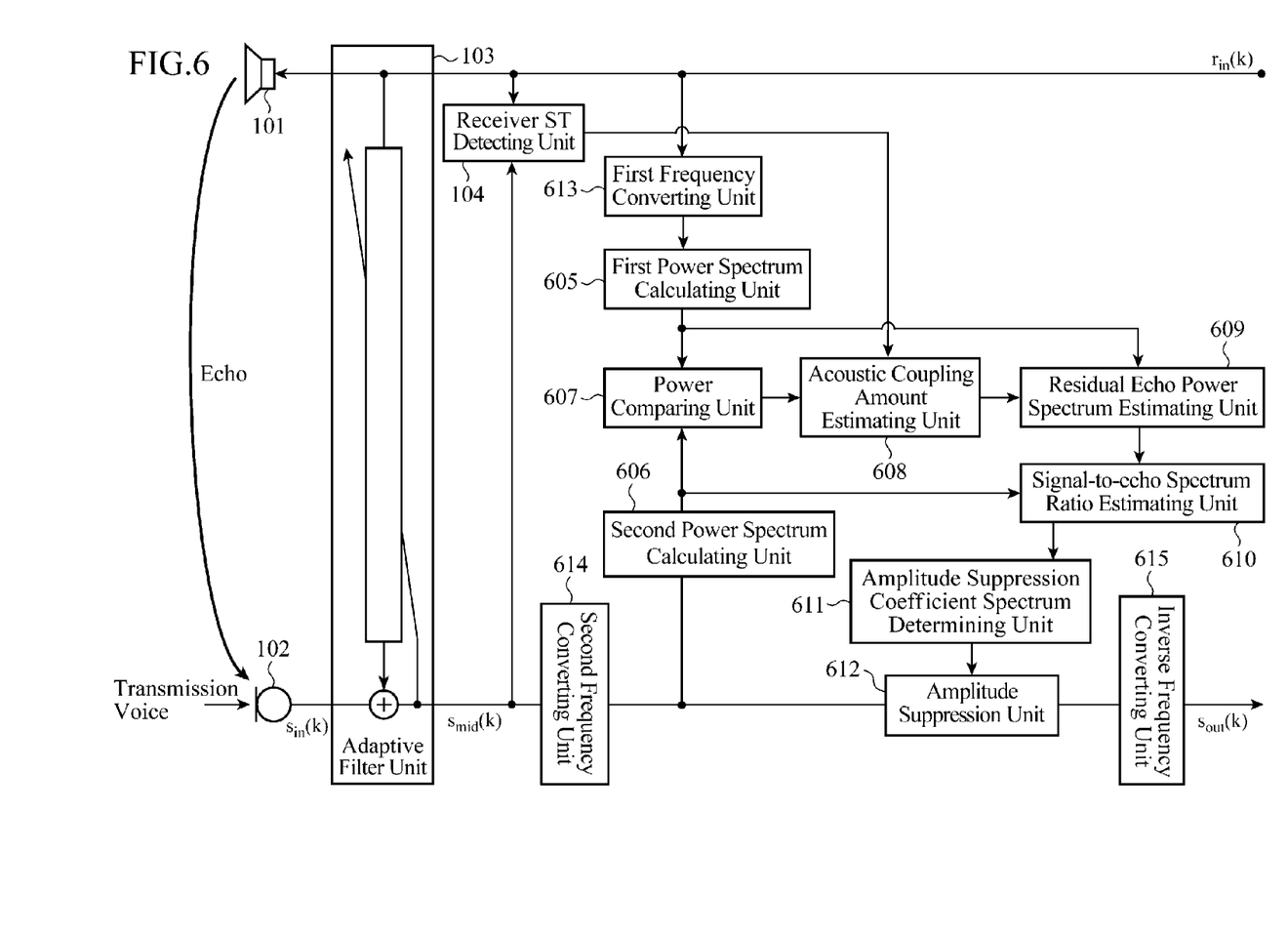
FIG. 6 is a block diagram showing a configuration of the echo canceller of an embodiment 4 in accordance with the present invention.

Although the echo cancellers of the foregoing the embodiments 1-3 have a configuration of amplitude suppressing the send-mid signal in the time domain, the echo canceller of the present embodiment has a configuration of amplitude suppressing in the frequency domain. FIG. 6 is a block diagram showing a configuration of the echo canceller of the embodiment 4 in accordance with the present invention. The echo canceller comprises the speaker 101, microphone 102, adaptive filter unit 103, receiver ST detecting unit 104, a first power spectrum calculating unit 605, a second power spectrum calculating unit 606, a power comparing unit 607, an acoustic coupling amount estimating unit 608, a residual echo power spectrum estimating unit 609, a signal-to-echo spectrum ratio estimating unit 610, an amplitude suppression coefficient spectrum determining unit 611, an amplitude suppression unit 612, a first frequency converting unit 613, a second frequency converting unit 614, and an inverse frequency converting unit 615. Incidentally, in FIG. 6, the same or like components to those of FIG. 1 are designated by the same reference numerals and their description will be omitted.

The first frequency converting unit 613 converts the received signal $r_{in}(k)$ to a frequency spectrum called a received signal spectrum $R(\omega,k)$, where ω designates frequency and k designates time.

The second frequency converting unit 614 converts the send-mid signal $S_{mid}(k)$ supplied from the adaptive filter unit 103 to a frequency spectrum called a send-mid signal spectrum $S(\omega,k)$. As the frequency converting processing of the first and second frequency converting units 613 and 614, FFT (Fast Fourier Transform) is used.

The first power spectrum calculating unit 605 calculates the received signal power spectrum from the received signal spectrum R(ω,k) supplied from the first frequency converting unit 613. The second power spectrum calculating unit 606 calculates the send-mid signal power spectrum from the send-mid signal spectrum S(ω,k) supplied from the second frequency converting unit 614. The power comparing unit 607 receives the received signal power spectrum and the send-mid signal power spectrum from the first and second power spectrum calculating units 605 and 606, and calculates the power ratio sr(ω,k), the ratio of the two, according to the following Expression (12).

$$sr(\omega, k) = \frac{|S(\omega, k)|^2}{|R(\omega, k)|^2} \quad (12)$$

sr(ω,k): power ratio
|S(ω,k)|$^2$: send-mid signal power spectrum
|R(ω,k)|$^2$: received signal power spectrum The acoustic coupling amount estimating unit 608, receiving the detection flag RST(k), which is the detection result of the single talk state, from the receiver ST detecting unit 104, updates the estimated amount of acoustic coupling H(ω,k) according to the following Expression (13) when the RST(k) is 1, that is, in the receiver single talk state, where (0<α≤1).

$$H(\omega,k) = \alpha \cdot sr(\omega,k) + (1-\alpha)H(\omega,k-1) \quad (13)$$

The residual echo power spectrum estimating unit 609 receives the received signal power spectrum from the first power spectrum calculating unit 605 and the estimated amount of acoustic coupling from the acoustic coupling amount estimating unit 608, respectively, and calculates the estimated residual echo power spectrum according to the following Expression (14).

Incidentally, when considering the reverberation component of the echo, according to the following Expression (15) instead of the following Expression (14), the residual echo power spectrum estimating unit 609 can calculate the estimated residual echo power spectrum by adding the estimation value of the previous residual echo power spectrum multiplied by a prescribed coefficient β to the estimation value of the current residual echo power spectrum at the present calculation point, which is calculated from the estimated amount of acoustic coupling and the received power spectrum.

$$|E(\omega,k)|^2 = H(\omega,k) \times |R(\omega,k)|^2 \quad (14)$$

$$|E(\omega,k)|^2 = H(\omega,k) \times |R(\omega,k)|^2 + \beta |E(\omega,k-1)|^2$$

where (0<β<1) (15)

|E(ω,k)|$^2$: estimated residual echo power spectrum
|R(ω,k)|$^2$: received signal power spectrum The signal-to-echo spectrum ratio estimating unit 610 receives the send-mid signal power spectrum from the second power spectrum calculating unit 606 and the estimated residual echo power spectrum from the residual echo power spectrum estimating unit 609, respectively, and calculates the signal-to-echo spectrum ratio ser(k) according to the following defining Expression (16), where a is an arbitrary constant of a>0.

$$ser(\omega, k) = \frac{|S(\omega, k)|^2}{|E(\omega, k)|^2 + a} \quad (16)$$

The amplitude suppression coefficient spectrum determining unit 611 receives the signal-to-echo spectrum ratio ser(ω, k) from the signal-to-echo spectrum ratio estimating unit 610, and determines the amplitude suppression coefficient spectrum g(ω,k) using one of the methods of the foregoing embodiments 1-3.

The amplitude suppression coefficient spectrum determining unit 611 determines the amplitude suppression coefficient spectrum g(ω,k) according to the following Expression (17) when applying the method of the embodiment 1, and according to the following Expression (18) when applying the method of the embodiment 2.

$$g(\omega, k) = \begin{cases} \frac{1}{b} \sqrt{ser(\omega, k)^c} & ser(\omega, k) \le b^{\frac{2}{c}} \\ 1.0 & ser(\omega, k) > b^{\frac{2}{c}} \end{cases} \quad (17)$$

$$g(\omega, k) = \left(\frac{1}{b}\right)^{\left(1 - \frac{1}{1 + e^{-(10\log_{10}(ser(\omega,k))d)}}\right)} \quad (18)$$

In addition, when applying the method of the embodiment 3, the echo canceller has the amplitude suppression gain characteristic setting unit for retaining the characteristic data of the amplitude suppression gain G(ω,k), which define the characteristics of the amplitude suppression gain G(ω,k) corresponding to the logarithm signal-to-echo spectrum ratio SER(ω,k), and the amplitude suppression coefficient spectrum determining unit 611 reads the amplitude suppression gain G(ω, k) from the amplitude suppression gain characteristic setting unit, and converts it to the amplitude suppression coefficient spectrum g(ω,k)

Incidentally, when the amplitude suppression coefficient spectrum determining unit 611 determines the amplitude suppression coefficient spectrum g(ω,k) using the methods of the foregoing the embodiments 1-3, it needless to say that the advantages obtained by using the methods can also be achieved by the present embodiment.

The amplitude suppression unit 612 performs the nonlinear echo processing by multiplying the send-mid signal spectrum S(ω,k) by the amplitude suppression coefficient spectrum g(ω,k) and generates the send-out signal spectrum S$_{out}$(ω,k). Then, the inverse frequency converting unit 615 receives the send-out signal spectrum S$_{out}$(ω,k) from the amplitude suppression unit 612 and generates the send-out signal s$_{out}$(k) by the frequency reverse conversion.

In this way, the amplitude suppression coefficient spectrum determining unit 611 calculates the amplitude suppression coefficient spectrum g(ω,k) different from band to band in the frequency domain, thereby suppressing the frequency component mainly consisting of the echo component in the send-in signal, and retaining the frequency component mainly consisting of the transmission voice. Accordingly, as compared with the echo cancellers of the foregoing the embodiments 1-3 which carry out the amplitude suppression in the time domain, the echo canceller of the present embodiment 4 can further reduce the loss of the talker voice contained in the send-in signal.

As described above, according to the embodiment 4, the echo canceller is configured in such a manner that it comprises the adaptive filter unit 103 for outputting the send-mid signal by eliminating echo from the send-in signal which is a mixture of the transmission voice and echo; the receiver ST detecting unit 104 for detecting the single talk state of the receiving side using the received signal and send-mid signal; the first frequency converting unit 613 for converting the received signal to the received signal spectrum which is a frequency spectrum; the first power spectrum calculating unit 605 for calculating the power spectrum from the received signal spectrum; the second frequency converting unit 614 for converting the send-mid signal to the send-mid signal spectrum which is a frequency spectrum; the second power spectrum calculating unit 606 for calculating the power spectrum from the send-mid signal spectrum; the power comparing unit 607 for calculating the ratio between the send-mid signal power spectrum and the received signal power spectrum; the acoustic coupling amount estimating unit 608 for estimating and updating the estimated amount of acoustic coupling from the ratio between the send-mid signal power spectrum and the received signal power spectrum when the receiver ST detecting unit 104 detects the single talk state; the residual echo power spectrum estimating unit 609 for estimating the estimated residual echo power spectrum of the send-mid signal from the received signal power spectrum and the estimated amount of acoustic coupling; the signal-to-echo spectrum ratio estimating unit 610 for estimating the signal-to-echo spectrum ratio from the ratio between the send-mid signal power spectrum and the estimated residual echo power spectrum; the amplitude suppression coefficient spectrum determining unit 611 for determining the amplitude suppression coefficient spectrum in accordance with the signal-to-echo spectrum ratio; the amplitude suppression unit 612 for amplitude suppressing the send-mid signal spectrum according to the amplitude suppression coefficient spectrum; and the inverse frequency converting unit 615 for converting the amplitude suppressed send-mid signal spectrum to a time-series, and that it calculates the amplitude suppression coefficients differing from band to band on the frequency domain and carries out the amplitude suppression in the frequency domain. Accordingly, as compared with the case of performing the amplitude suppression in the time domain, it can further reduce the loss of the talker voice.

INDUSTRIAL APPLICABILITY

As described above, the echo canceller in accordance with the present invention determines the amplitude suppression coefficient used for the nonlinear echo processing according to the signal-to-echo ratio. Accordingly, it can realize the echo canceller with less auditory degradation in the talker voice and is suitable for being applied to an echo canceller of a hands-free phone and the like with a bad transmission-voice-to-echo ratio.

What is claimed is:

1. An echo canceller comprising:
an adaptive filter unit that outputs a send-mid signal by eliminating echo from a send-in signal in which transmission voice and echo are mixed;
a receiver single talk detecting unit that detects a single talk state on a receiving side using a received signal and the send-mid signal;
a first power calculating unit that calculates power of the received signal;
a second power calculating unit that calculates power of the send-mid signal;
an acoustic coupling amount estimating unit that estimates and updates an amount of acoustic coupling from a power ratio of the send-mid signal and the received signal when the receiver single talk detecting unit detects the single talk state;
a residual echo power estimating unit that estimates residual echo power of the send-mid signal from the power of the received signal and the amount of acoustic coupling;
a signal-to-echo ratio estimating unit that estimates a signal-to-echo ratio from a ratio between the power of the send-mid signal and the residual echo power;
an amplitude suppression coefficient determining unit that determines an amplitude suppression coefficient in accordance with the signal-to-echo ratio; and
an amplitude suppression unit that suppresses amplitude of the send-mid signal according to the amplitude suppression coefficient,
wherein the residual echo power estimating unit calculates the residual echo power of the send-mid signal by adding a value to the residual echo power estimated from the power of the current received signal and the amount of acoustic coupling, said value indicating a result of multiplying previously estimated residual echo power by a prescribed coefficient β (0<β<1), and wherein
the amplitude suppression coefficient determining unit determines the amplitude suppression coefficient corresponding to the signal-to-echo ratio according to the following expression:

$$g(k) = \begin{cases} \frac{1}{b}\sqrt{ser(k)^c} & ser(k) \leq b^{\frac{2}{c}} \\ 1.0 & ser(k) > b^{\frac{2}{c}} \end{cases}$$

g(k): amplitude suppression coefficient
ser(k): signal-to-echo ratio
b, c: arbitrary constants satisfying b>1 and c>0.

2. An echo canceller comprising:
an adaptive filter unit that outputs a send-mid signal by eliminating echo from a send-in signal in which transmission voice and echo are mixed;
a receiver single talk detecting unit that detects a single talk state on a receiving side using a received signal and the send-mid signal;
a first power calculating unit that calculates power of the received signal;
a second power calculating unit that calculates power of the send-mid signal;
an acoustic coupling amount estimating unit that estimates and updates an amount of acoustic coupling from a power ratio of the send-mid signal and the received signal when the receiver single talk detecting unit detects the single talk state;
a residual echo power estimating unit that estimates residual echo power of the send-mid signal from the power of the received signal and the amount of acoustic coupling;
a signal-to-echo ratio estimating unit that estimates a signal-to-echo ratio from a ratio between the power of the send-mid signal and the residual echo power;
an amplitude suppression coefficient determining unit that determines an amplitude suppression coefficient in accordance with the signal-to-echo ratio; and
an amplitude suppression unit that suppresses amplitude of the send-mid signal according to the amplitude suppression coefficient,
wherein the residual echo power estimating unit calculates the residual echo power of the send-mid signal by adding a value to the residual echo power estimated from the power of the current received signal and the amount of acoustic coupling, said value indicating a result of multiplying previously estimated residual echo power by a prescribed coefficient β (0<β<1), and wherein the amplitude suppression coefficient determining unit determines the amplitude suppression coefficient corresponding to the signal-to-echo ratio according to the following expression:

$$g(k) = \left(\frac{1}{b}\right)^{\left(1-\frac{1}{1+c^{-(10\log_{10}(ser(k))-d)}}\right)}$$

g(k): amplitude suppression coefficient
ser(k): signal-to-echo ratio
b, c: arbitrary constants satisfying b>1 and c>0
d: arbitrary constant.

3. An echo canceller comprising:
an adaptive filter unit that outputs a send-mid signal by eliminating echo from a send-in signal in which transmission voice and echo are mixed;
a receiver single talk detecting unit that detects a single talk state on a receiving side using a received signal and the send-mid signal;
a first power calculating unit that calculates power of the received signal;
a second power calculating unit that calculates power of the send-mid signal;
an acoustic coupling amount estimating unit that estimates and updates an amount of acoustic coupling from a power ratio of the send-mid signal and the received signal when the receiver single talk detecting unit detects the single talk state;
a residual echo power estimating unit that estimates residual echo power of the send-mid signal from the power of the received signal and the amount of acoustic coupling;
a signal-to-echo ratio estimating unit that estimates a signal-to-echo ratio from a ratio between the power of the send-mid signal and the residual echo power;
an amplitude suppression coefficient determining unit that determines an amplitude suppression coefficient in accordance with the signal-to-echo ratio; and
an amplitude suppression unit that suppresses amplitude of the send-mid signal according to the amplitude suppression coefficient,
wherein the residual echo power estimating unit calculates the residual echo power of the send-mid signal by adding a value to the residual echo power estimated from the power of the current received signal and the amount of acoustic coupling, said value indicating a result of multiplying previously estimated residual echo power by a prescribed coefficient β (0<β<1), and wherein the echo canceller further comprising:
an amplitude suppression gain characteristic setting unit that retains amplitude suppression gain characteristics, which define relationship between the signal-to-echo ratio and the amplitude suppression coefficient, in the form of amplitude suppression gain characteristic data that define the amplitude suppression gain characteristics by lines or an approximation curve which connect or connects a plurality of changing points arbitrarily set on a characteristic space, wherein
the amplitude suppression coefficient determining unit determines the amplitude suppression coefficient corresponding to the signal-to-echo ratio from the amplitude suppression gain characteristic data retained in the amplitude suppression gain characteristic setting unit.

* * * * *